(12) United States Patent
Yoshino et al.

(10) Patent No.: US 6,884,270 B2
(45) Date of Patent: Apr. 26, 2005

(54) METHOD OF MANUFACTURING A BATTERY INCLUDING A POSITIVE ELECTRODE, A NEGATIVE ELECTRODE AND AN ELECTROLYTE LAYER

(75) Inventors: Takanobu Yoshino, Fukushima (JP); Tsuyoshi Sugiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 09/811,898

(22) Filed: Mar. 19, 2001

(65) Prior Publication Data

US 2002/0045094 A1 Apr. 18, 2002

(30) Foreign Application Priority Data

Mar. 17, 2000 (JP) .................................. P2000-076614

(51) Int. Cl.$^7$ ................................................ H01M 6/00
(52) U.S. Cl. ...................... 29/623.5; 429/233; 429/234; 429/245
(58) Field of Search .......................... 29/623.5, 623.1; 429/233, 234, 245, 59, 127, 137, 146, 162

(56) References Cited

U.S. PATENT DOCUMENTS

| | | | | |
|---|---|---|---|---|
| 6,162,264 A | * | 12/2000 | Miyazaki et al. | .......... 29/623.5 |
| 6,314,638 B1 | * | 11/2001 | Kaido et al. | .................. 29/730 |
| 6,387,562 B1 | * | 5/2002 | Akahira | ...................... 429/94 |
| 6,461,757 B1 | * | 10/2002 | Sasayama et al. | ............ 429/59 |

* cited by examiner

*Primary Examiner*—Dah-Wei Yuan
(74) *Attorney, Agent, or Firm*—Sonnenschein, Nath & Rosenthal LLP

(57) ABSTRACT

To provide a method of manufacturing a battery capable of enhancing productivity and preventing deterioration of the battery performance. After attaching a positive electrode terminal to a belt-shaped electrode, electrolyte layers are formed. This can decrease the number of manufacturing processes after forming electrolyte layers, which effectively prevents that solvents in the electrolyte evaporates or the electrolyte layers are absorbed the water. Thereby, manufacturing yields of the battery can be enhanced, Additionally, a battery excellent in discharge capabilities and stable in voltage can be attained.

15 Claims, 9 Drawing Sheets

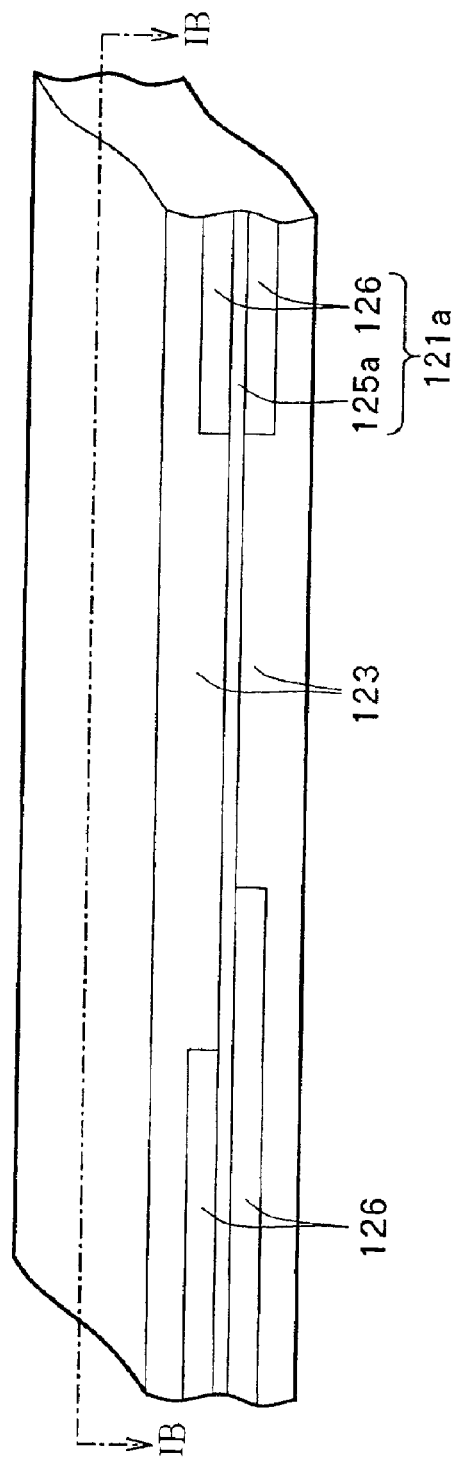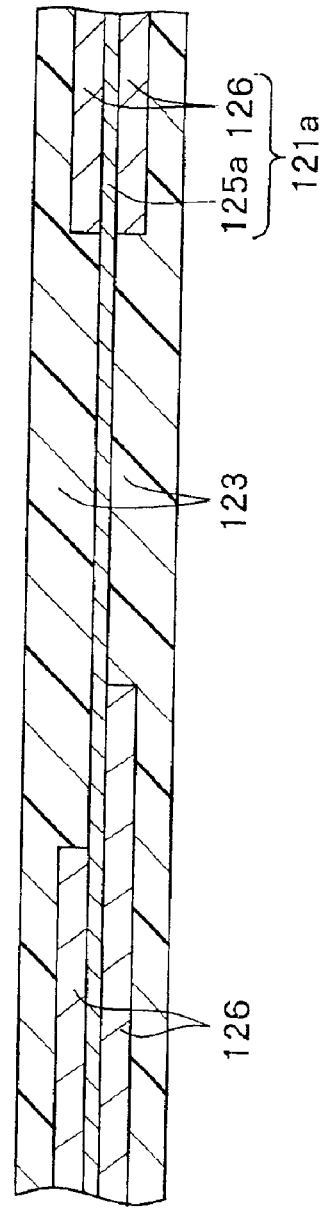
FIG.1A RELATED ART
FIG.1B RELATED ART

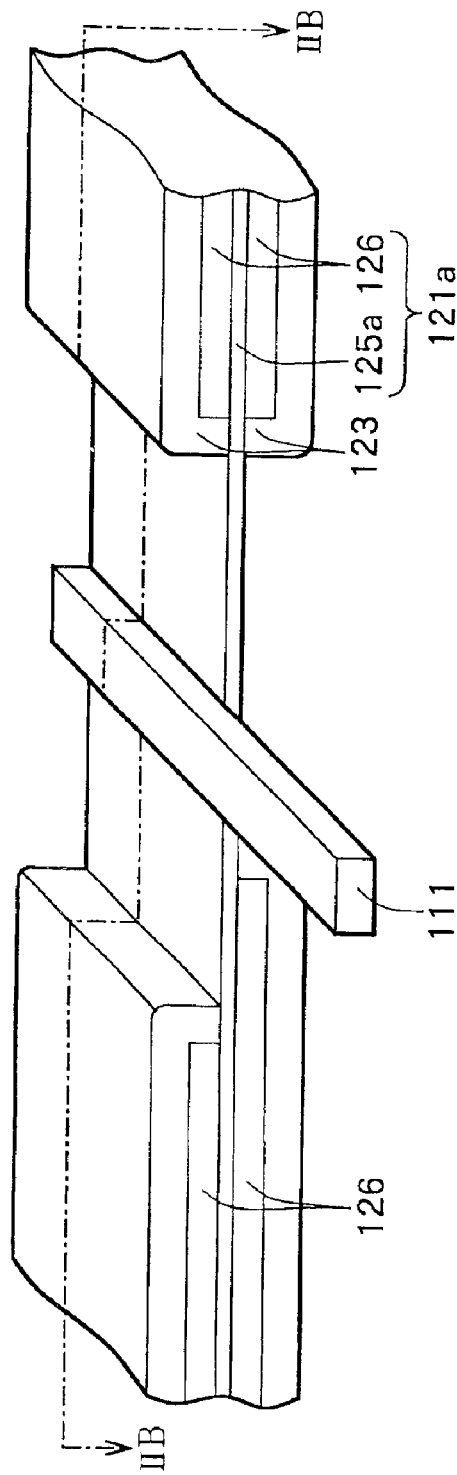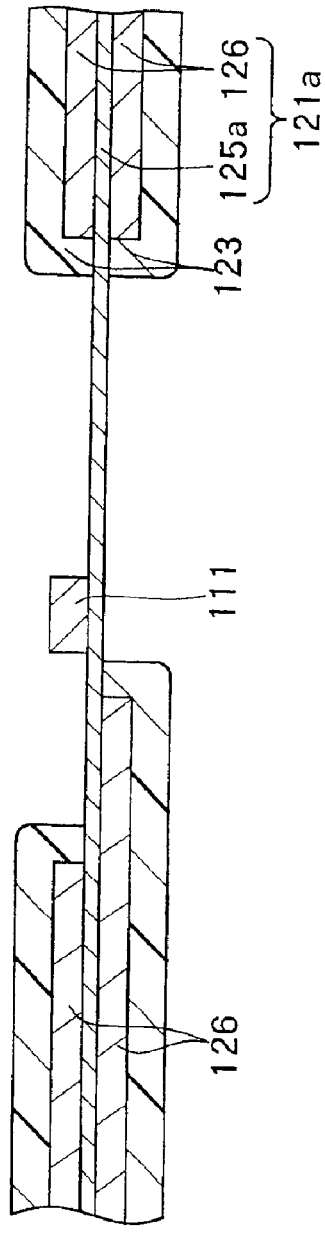
FIG.2A RELATED ART
FIG.2B RELATED ART

METHOD OF MANUFACTURING A BATTERY INCLUDING A POSITIVE ELECTRODE, A NEGATIVE ELECTRODE AND AN ELECTROLYTE LAYER

RELATED APPLICATION DATA

The present application claims priority to Japanese Application No. P2000-076614 filed Mar. 17, 2000, which application is incorporated herein by reference to the extent permitted by law.

BACKGROUND OF THE INVENTION

The present invention relates to a method of manufacturing a battery comprising a step of forming an electrolyte layer coated with electrolyte onto an electrode.

Recently, portable electric equipment has been developed, hence, a battery has an important role as an electric source of such portable electric equipment. The portable electric equipment is required to be miniature and lightweight, in response to this request, the battery is also requested to be miniature in accord with accommodating space inside the portable electric equipment, and to be lightweight in order not to increase weight of the portable electric equipment as possible.

As the battery responding to such a request, in replace of a lead-acid battery and a nickel-cadmium battery, which are used to be the mainstream in the secondary battery, a lithium secondary battery and a lithium ion secondary battery whose energy density and output density are higher than that of these batteries, are expected.

Conventionally, in the lithium secondary battery or the lithium ion secondary battery, liquid-type electrolyte, which is dissolved lithium ion in nonaqueous solvents, is employed as a material working for ion conduct (hereinafter, it is called as to electrolyte liquid). With this reason, a package must be made of a metal case for preventing leakage and strictly maintain hermeticity inside the battery. However, with the metal case employing as the package, it is extremely difficult to produce a battery such as a sheet-like battery, which is thin and large, a card-like battery, which is thin and small, or a battery, which is flexible and freer in shape.

In replace of the electrolyte liquid, it is therefore suggested that a secondary battery is employed electrolyte such as gel-type electrolyte, which macromolecular compounds has electrolyte liquid including lithium salts, solid-type electrolyte, in which lithium salts are diffused to macromolecular compounds having ion conductivity, or electrolyte, in which a solid-type inorganic conductor has lithium salts. In these batteries are free from leakage, so that the metal case is unnecessary as a package. This can be gained miniaturization, reduction in weight and in thickness of the battery by using a laminate film and the like as a package material, which results in a battery flexible in shape.

In the case of employing the gel-type electrolyte and the like, for instance, electrolyte layers are formed on electrode mixture layers formed on an electrode collector by means of a method described later. First, as shown in FIGS. 1A and 1B, a plurality of electrode mixture layers 126 is intermittently formed on a belt-shaped electrode collector 125a to form a belt-shaped electrode 121a, and the belt-shaped electrode 121a is impregnated into an unillustrated tank accommodating the electrolyte. Next, the belt-shaped electrode 121a is pulled up from the tank, and scraped the electrolyte adhering to its both faces, which forms electrolyte layers 123 with a predetermined thickness on the both faces of the belt-shaped electrode 121a. Following this, the electrolyte of the electrolyte layers 123 are dried and the belt-shaped electrode 121a formed the electrolyte layers 123 thereon is rolled with a separating paper. After this, the rolled electrode 121a is cut between the electrode mixture layers 126 so as to make a plurality of electrodes. In connection with this, as for the reason that the belt-shaped electrode 121a is rolled with the separating paper, it prevents that solvents in the electrolyte evaporates or the electrolyte layers 123 are absorbed the water. FIG. 1B is a view in response to a cross sectional structure corresponding to a IB—IB line in FIG. 1A.

In the above-mentioned method, for the reason that the electrolyte layers 123 are formed by impregnating the belt-shaped electrode 121a into the tank, the electrolyte directly adheres on the belt-shaped electrode collector 125a even in regions where the electrode mixture layers 126 are unformed. However, an electrode terminal, which connects the electrode collector to an external terminal, needs to be attached in the regions, for this reason, as shown in FIGS. 2A and 2B, the electrolyte adhering on the region where the electrode terminal is attached must be stripped.

When stripping the electrolyte, the separating paper is necessary to be stripped temporally, which the solvents in the electrolyte evaporate. This causes voltage failure and capacity failure of the battery.

Further, in the case that the electrode mixture layers 126 are formed onto the both faces of the belt-shaped electrode corrector 125a, if regions where the electrode mixture layers 126 are formed, are different in a surface and a back of the belt-shaped electrode corrector, a thickness of the belt-shaped electrode 121a becomes various depending on regions. For this reason, the electrolyte layers 123 are difficult to achieve its evenness by means of a method of scrapping with a scoop.

SUMMARY OF THE INVENTION

The invention has been achieved in consideration of the above problems and its object is to provide a method of manufacturing a battery capable of enhancing productivity and preventing deterioration of the battery performance.

A method of manufacturing a battery according to the present invention is a method of manufacturing a battery including a positive electrode, a negative electrode, and an electrolyte layer, and comprises steps of attaching a terminal to at least one face of either the positive electrode or the negative electrode, and of forming the electrolyte layer on other regions excluding a region where the terminal is attached to one face of either the positive electrode or the negative electrode.

In a method of manufacturing a battery according to the present invention, a terminal is attached to at least one face of either a positive electrode or a negative electrode, and an electrolyte layer is formed on one face of either the positive electrode or the negative electrode to which the terminal is attached, so that the number of manufacturing processes after forming the electrolyte layer can decrease, which prevents that solvents in the electrolyte evaporates and the electrolyte layer is absorbed the water. Thereby, manufacturing yields of the battery can increase. In addition, the battery which is excellent in discharge capabilities and stable in its voltage can be achieved.

Other and further objects, features and advantages of the invention will appear more fully from the following description.

BRIEF DESCRIPTION OF THE DRAWINGS

These and other objects and features of the present invention will become clear from the following description of the preferred embodiments given with reference to the accompanying drawings, in which:

FIG. 1A is a perspective view showing a method of manufacturing a conventional battery;

FIG. 1B is a cross sectional view corresponding to a IB—IB line in FIG. 1A;

FIG. 2A is a perspective view explaining the manufacturing process following to FIG. 1;

FIG. 2B is a cross sectional view corresponding to a IIB—IIB line in FIG. 2A;

FIG. 8A is an enlarged plain view showing a part of a belt-shaped positive electrode;

FIG. 8B is an enlarged plain view showing a part of a belt-shaped negative electrode;

DETAILED DESCRIPTION OF THE PREFERRED EMBODIMENTS

Figure 3:
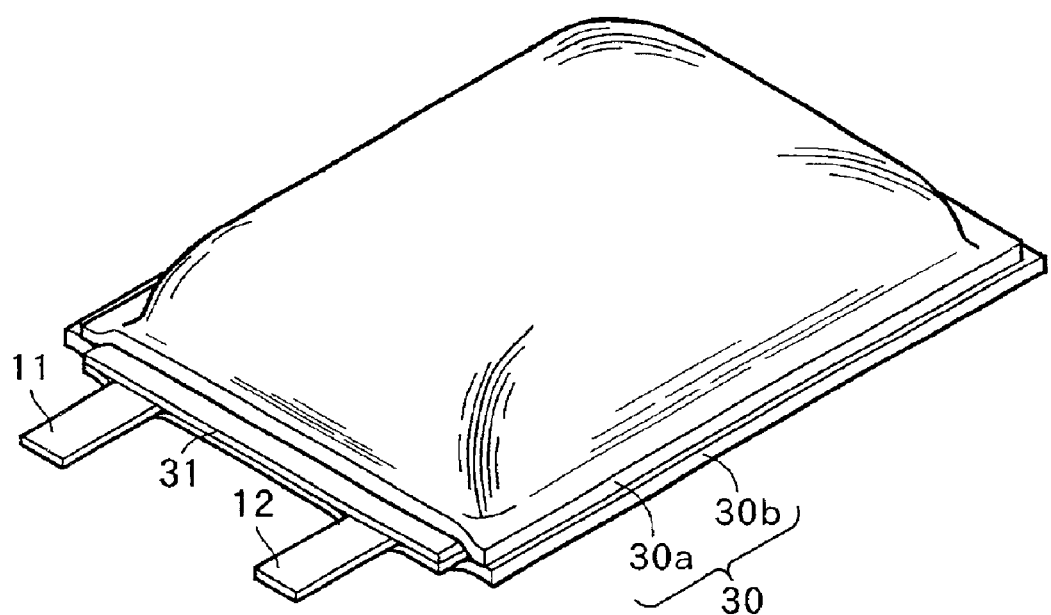
FIG. 3 is a perspective view showing a structure of a battery manufactured using a method of manufacturing a battery relative to an embodiment of the present invention.

Embodiments of the invention will be described in detail hereinbelow by referring to the drawings.

First, a configuration of a secondary battery manufactured by means of a method of manufacturing a battery relative to an embodiment of the present invention will be explained.

Figure 4:
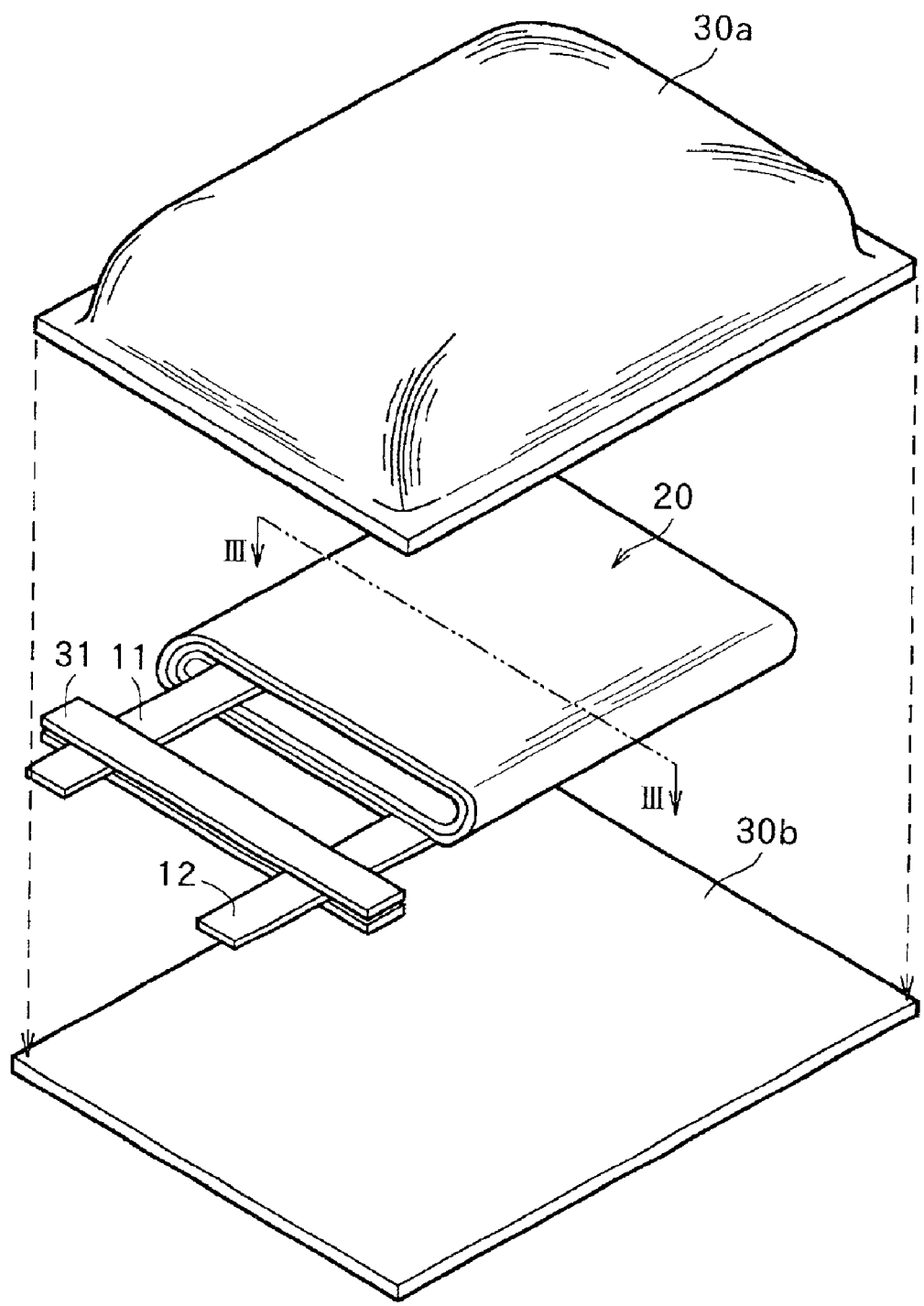
FIG. 4 is a separated perspective view showing the battery illustrated in FIG. 3 in each part.

FIG. 3 is a perspective view showing an outside structure of the secondary battery manufactured by means of the method of manufacturing a battery relative to the embodiment of the present invention. FIG. 4 is a separated view showing the secondary battery illustrated in FIG. 3 in each part. The secondary battery has a structure such that a rolled electrode 20 attached to a positive electrode terminal 11 and a negative electrode terminal 12 is enclosed with a package member 30.

Figure 5:
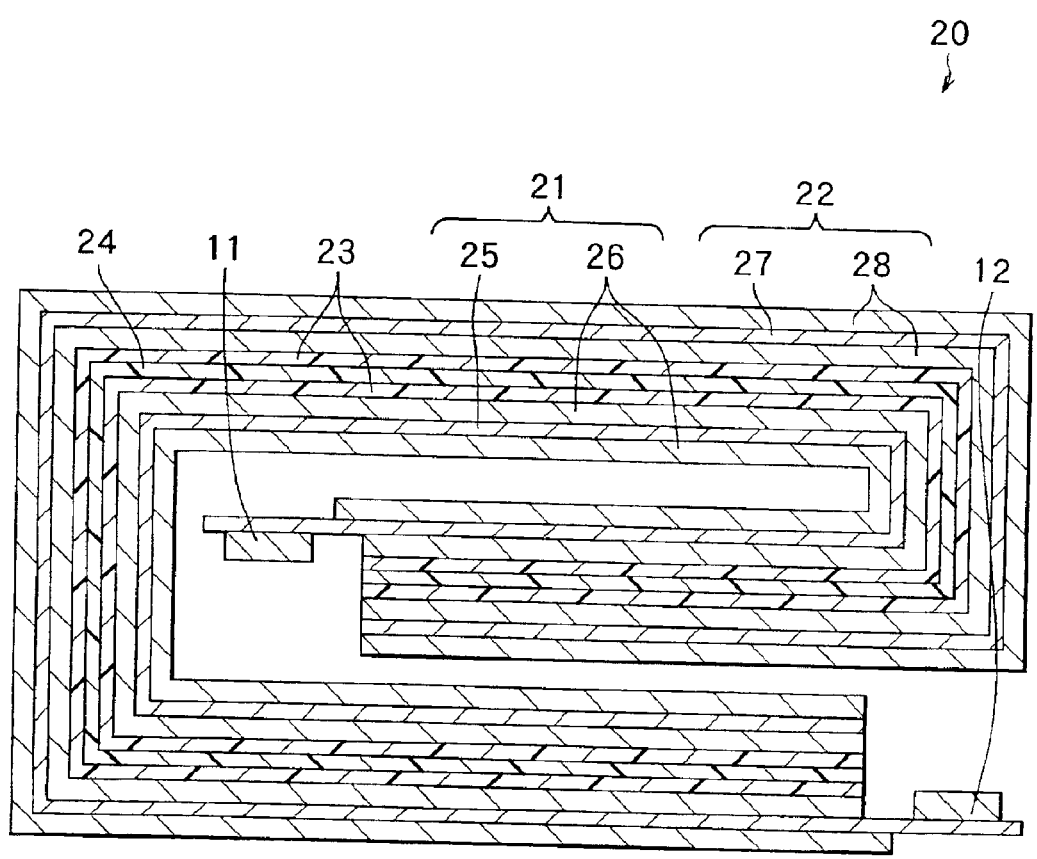
FIG. 5 is a cross sectional view corresponding to a III—III line of a rolled electrode illustrated in FIG. 4.

FIG. 5 is a view showing a cross sectional structure corresponding to a III—III line of the rolled electrode 20 illustrated in FIG. 4. The rolled electrode 20 is a structure such that a positive electrode 21 and a negative electrode 22 are stacked in a manner to sandwich gel-type electrolyte layers 23 therebetween, which is rolled many times. Between the positive electrode 21 and the negative electrode 22, a separator 24 is inserted with the electrolyte layers 23 in-between. For simplification of the drawing, FIG. 5 shows the rolled electrode 20, which is rolled only once.

The positive electrode 21 has a positive collector layer 25 and positive electrode mixture layers 26 disposed on both faces of the positive collector layer 25. One end of the positive collector layer 25 in a longitudinal direction is exposed. The negative electrode 22 has a negative collector layer 27 and negative electrode mixture layers 28 disposed on both faces of the negative collector layer 27. One end of the negative collector layer 27 in a longitudinal direction is exposed.

The positive electrode terminal 11 and the negative electrode terminal 12 are led from an inside of the package member 30 toward the outside, for example, in the same direction. A part of the positive electrode terminal 11 connects with the exposed part of the positive collector layer 25 inside the package member 30. On the other hand, a part of the negative electrode terminal 12 connects with the exposed part of the negative collector layer 27 inside the package member 30. As shown in FIGS. 3 and 4, the package member 30 includes a pair of rectangular films 30a and 30b. The positive electrode terminal 11 and the negative electrode terminal 12 adheres to the pair of films 30a and 30b with films 31 for enhancing adhesions in-between in order to prevent the entry of the air.

Next, referencing to FIGS. 6–9, a method of manufacturing the secondary battery will be described. Here, a case where a plurality of the second batteries is made, will be explained. FIG. 7 is a view showing a cross sectional structure corresponding to a V—V line in FIG. 6.

Figure 6:
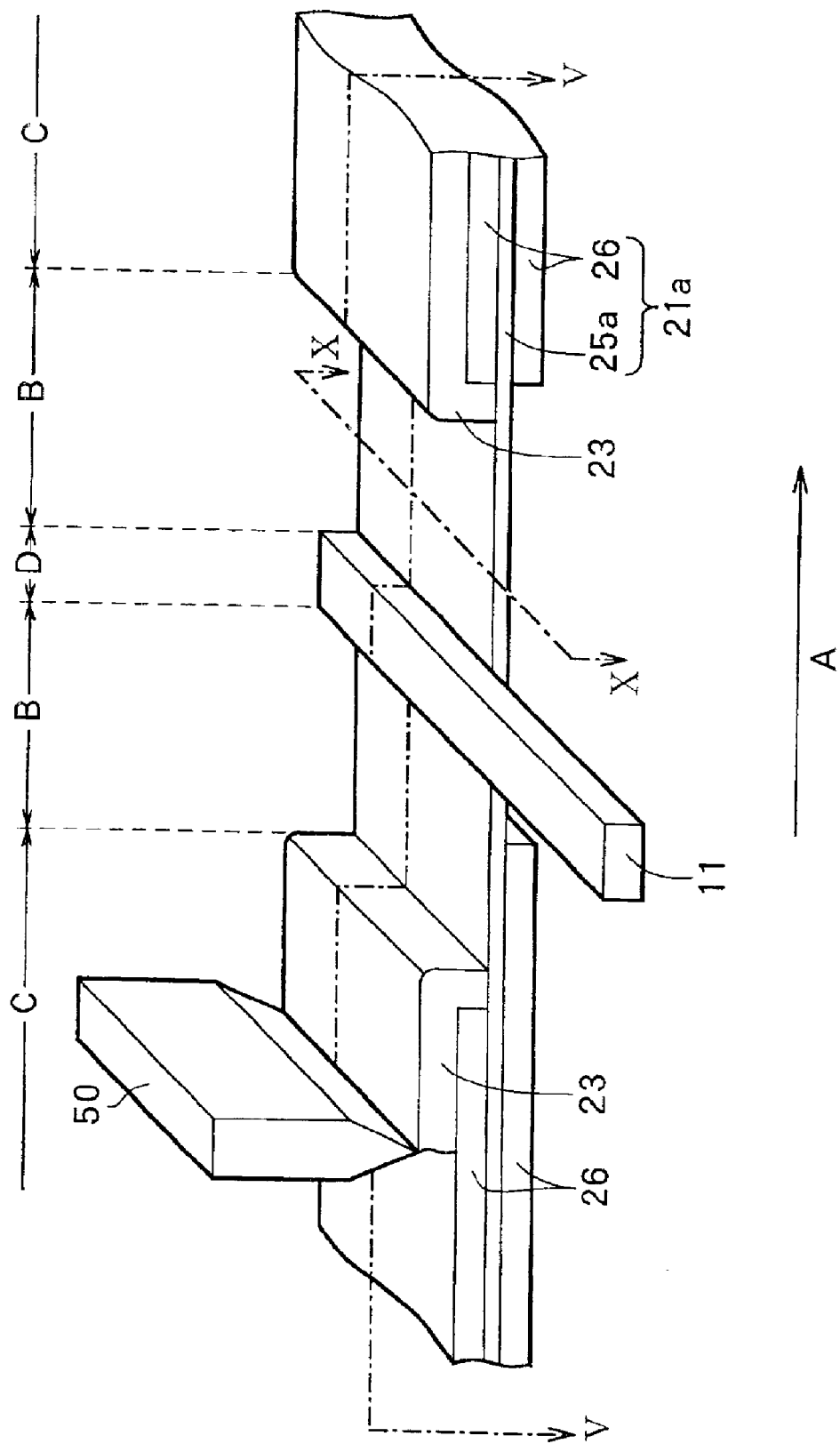
FIG. 6 is a perspective view explaining the method of manufacturing the battery relative to the embodiment of the present invention.
Figure 7:
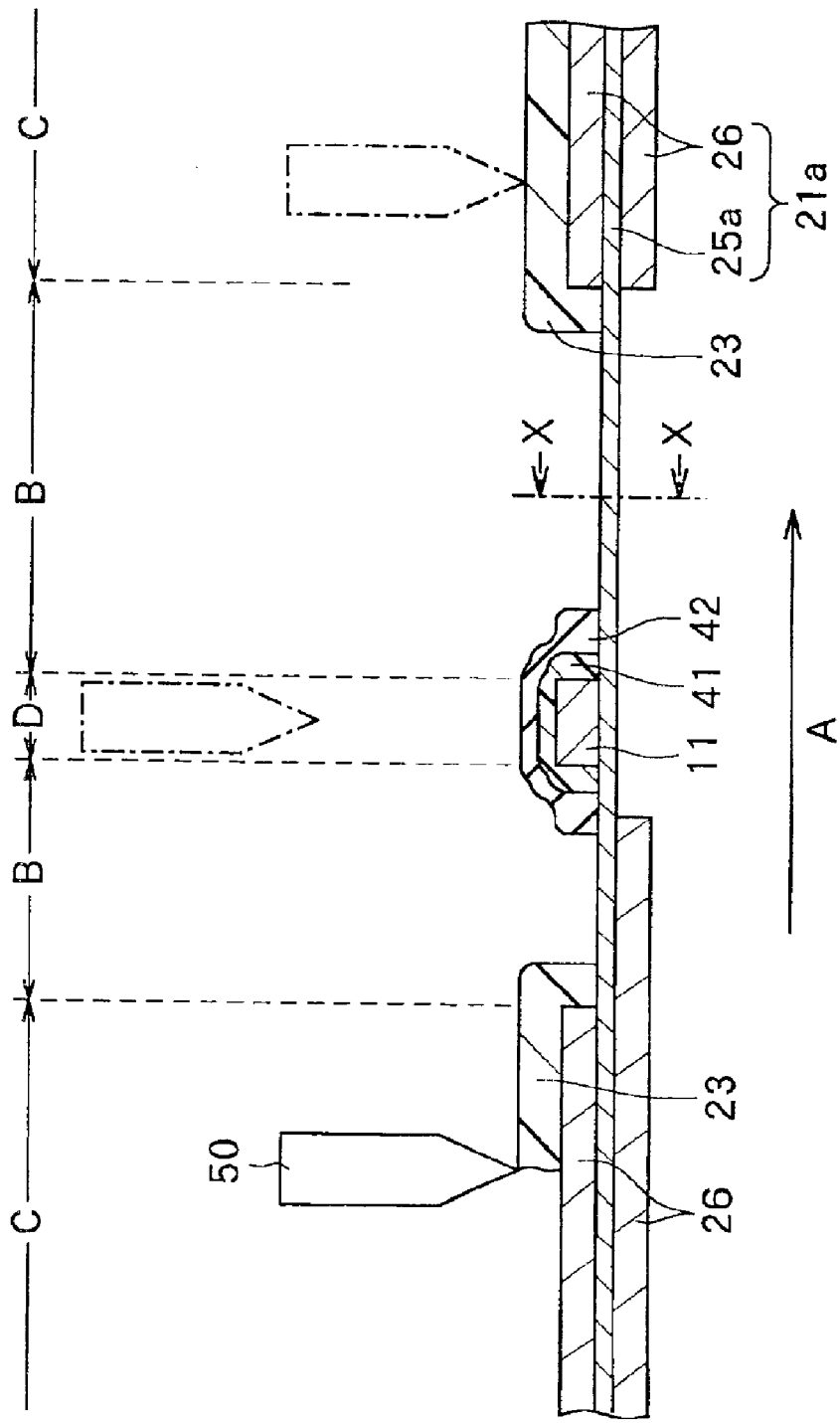
FIG. 7 is a cross sectional view corresponding to a V—V line in FIG. 6.

As shown in FIGS. 6 and 7, for example, a belt-shaped positive electrode 21a is produced as an electrode, which a plurality of the positive electrode mixture layers 26 is sequentially formed on a belt-shaped positive collector 25a at a predetermined interval. The belt-shaped positive electrode 21a becomes the above-mentioned the positive electrode 21 (see FIG. 5) by separating individually. Producing the belt-shaped positive electrode 21a is conducted with the following manner. First, positive electrode mixtures including positive electrode active materials, conducting agents such as carbon black or graphite, and binders such as polyvinylidene fluoride and so on, are diffused to solvents such as dimethylformaldehyde or N-methylpyrrolidone so as to make positive electrode mixture slurry. Then, the positive electrode mixture slurry is intermittently applied onto a surface and a back of the belt-shaped positive electrode collector 25a with, for example, 50 $\mu$m thickness, then, the belt-shaped positive electrode collector 25a is dried and subjected to compression molding. The belt-shaped positive electrode collector 25a is made of metal foil such as aluminum (Al) foil, nickel (Ni) foil or stainless foil whose thickness is, for example, 15 $\mu$m.

At this point, as for the positive electrode active materials, metal oxide, metal sulfide, or one kind or more than two kinds materials among specific macromolecule materials are preferably employed. The positive electrode active materials can be selected depending on its purpose for use, however, if high energy density is desired, lithium (Li) mixed oxide, which mainly includes $Li_xMO_2$ is preferable. A value of x varies in accord with a charge-discharge state of the battery, and usually satisfies $0.05 \leq x \leq 1.12$. In this composition formula, M is preferably more than one kind of transition metal, and more preferably, at least, one of materials among cobalt (Co), nickel and manganese (Mn). A specific example of such lithium mixed oxide can satisfy $LiNi_yCo_{1-y}O_2$ ($0 \leq y \leq 1$) or $LiMn_2O_4$.

Figure 8A:
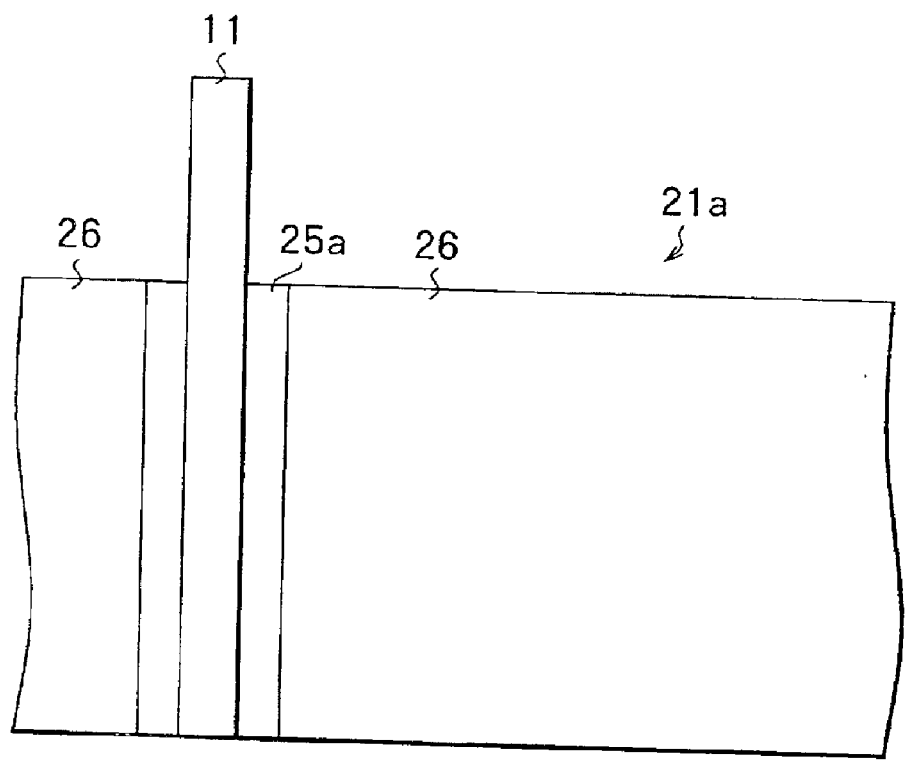
FIGS. 8A and 8B are plain views explaining the method of manufacturing the battery relative to the embodiment of the present invention.
Figure 8B:
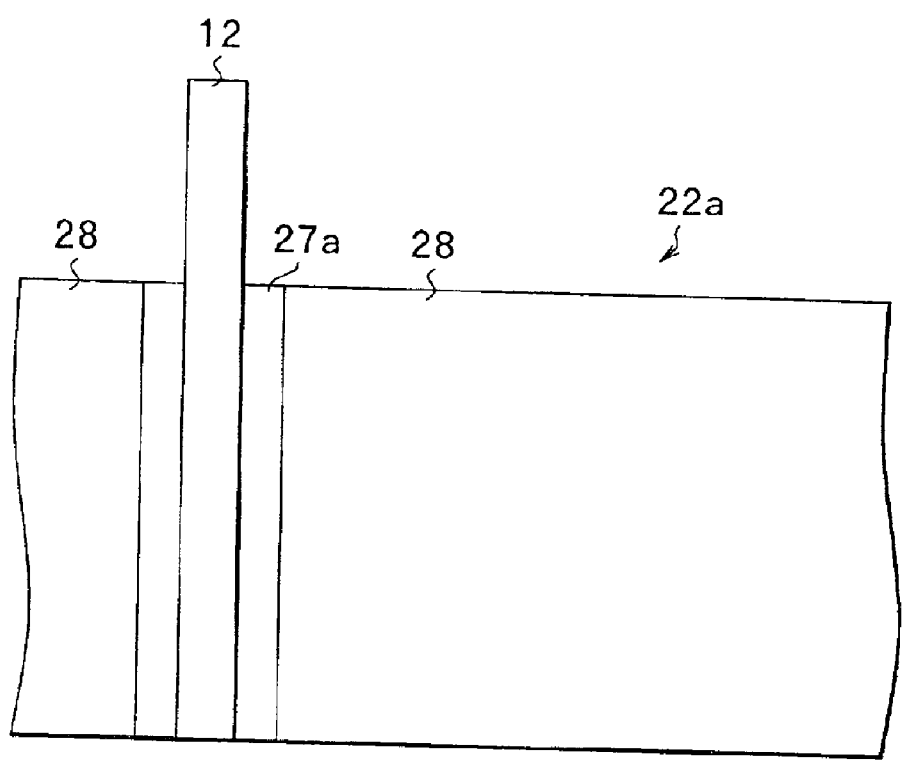

After producing the belt-shaped positive electrode 21a, as shown in FIG. 8A, the positive electrode terminal 11 made of metal materials with 70 μm thickness such as aluminum, nickel, or stainless is respectively attached to collector exposed regions in the surface of the belt-shaped positive electrode collector 25a with an adhesive material (ex. sealant) 41 (see FIG. 7). Following this, an adhesive tape 42 made of insulating materials adheres thereon in a manner to cover the adhesive material 41 (see FIG. 7). This adhesive tape 42 is used for protecting the positive electrode terminal 11 and preventing short circuit between the positive electrode terminal 11 and the negative electrode 22 or between the positive electrode terminal 11 and the negative electrode terminal 12 in order to maintain electrical insulation. In FIGS. 6 and 8, for simplification of the drawings, the adhesive material 41 and the adhesive tape 42 are omitted.

After attaching the positive electrode terminal 11, for example, electrolyte layers 23 are respectively formed onto the exposed faces of each of the positive electrode mixture layers 26 on the surface of the belt-shaped positive electrode collector 25a (that is, a surface to which the positive electrode terminal 11 is attached) with a method described later in a drying atmosphere. Additionally, in case of forming the electrolyte layers 23 on the exposed faces of each of the positive electrode mixture layers 26 on the back of the belt-shaped positive electrode collector 25a, for example, the electrolyte layers 23 are respectively formed on a single face at each time.

Figure 9:
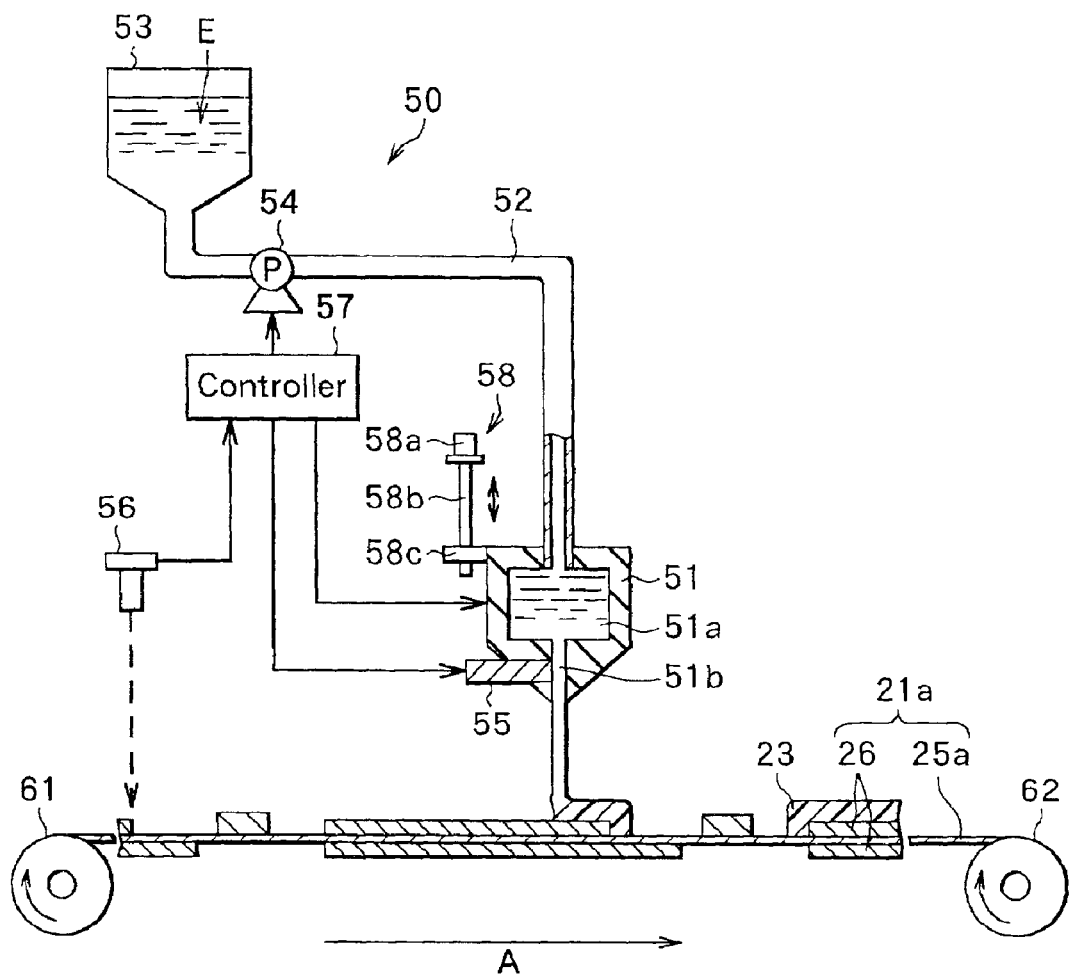
FIG. 9 is a cross sectional view partly showing a schematic structure of a coating machine used for the method of manufacturing the battery relative to the embodiment of the present invention.

FIG. 9 is a view showing a structure example of a coating machine used here. The coating machine is provided with an electrolyte-delivering machine 50 for delivering electrolyte E, a conveying roller 61 for conveying a belt-shaped electrode (here, the belt-shaped positive electrode 21a) and a winding roller 62.

The electrolyte-delivering machine 50 has a nozzle 51 and an up-and-down mechanism 58, which moves the nozzle 51 in an up-and-down direction. The up-and-down mechanism 58 includes a motor 58a, a screw 58b attached to one end of the motor 58a, and an up-and-down carrier 58c screwed into the screw 58b. The nozzle 51 is attached to the up-and-down carrier 58c. A filling unit 51a for filling the electrolyte E is disposed in the nozzle 51. One end of a supplying tube 52 is in communication with the filling unit 51a and the other end of that is in communication with a tank 53 in which the electrolyte E is accommodated. In the middle of the supplying tube 52, a supplying pump 54 is disposed as a pressurization means. In the middle of a flowing path 51b where the electrolyte E of the nozzle 51 passes through, a shatter 55 capable of opening and closing the flowing path 51b, is disposed. With an unillustrated driving mechanism, the shatter 55 is movable in either a position of closing the flowing path 51b or a position of opening the flowing path 51b. Here, the supplying pump 54 is disposed outside the nozzle 51, the nozzle 51 may be a built-in gear pump as a pressurization mechanism.

The electrolyte-delivering machine 50 includes a sensor 56 disposed in a side near the conveying roller 61 rather than the nozzle 51 in the vicinity of the nozzle unit 51. The sensor 56 is used for detecting predetermined positions of the belt-shaped electrode while being conveyed, and transmits a detecting signal to a controller 57. In response to the detecting signal, the controller 57 controls the nozzle 51, the supplying pump 54 and the shutter 55 as described later.

In the coating machine, the belt-shaped electrode 21a is carried in a horizontal direction from the conveying roller 61, and conveyed at a fixed speed in a direction shown as an arrow A in FIG. 9, then, the electrolyte E is applied onto the positive electrode mixture layers 26, and rolled with the winding roller 62.

In the embodiment, when forming the electrolyte layers 23 on the belt-shaped electrode, initially, the electrolyte E is accommodated into the above-mentioned tank 53 of the electrolyte-delivering machine 50. As for the electrolyte E, materials including lithium salt as an electrolyte salt, nonaqueous solvents which dissolve lithium salt, and macromolecular compounds, are employed. As for lithium salt, $LiPF_6$, $LiAsF_6$, $LiBF_4$, $LiClO_4$, $LiCF_3SO_3$, $Li(CF_3SO_2)_2N$ or $LiC_4F_9SO_3$ are suitable and one kind or more than two kinds materials may be used by mixing among these materials.

As for the nonaqueous solvents, for instance, ethylene carbonate, propylene carbonate, butylene carbonate, γ-butyl lactone, γ-valerolactone, diethoxyethane, tetrahydrofuran, 2-methyltetrahydrofuran, 1,3-dioxolane, methyl acetate, methyl propionicacid, dimethyl carbonate, diethyl carbonate, ethylmethyl carbonate, 2,4-difluoroanisole, 2,6-difluoroanisole, or, 4-bromoveratrol are suitable and one kind or more than two kinds materials may be used by mixing among these materials. In the case of using laminate films described later as the package member 30, materials whose boiling point is above 150° C. such as ethylene carbonate, propylene carbonate, γ-butyl lactone, 2,4-difluoroanisole, 2,6-difluoroanisole, or, 4-bromoveratrol and so one are preferably used. As for this reason, easy vaporization causes bulges in the package member 30, which results in a disfigured package.

As for the macromolecular compounds, polyvinylydene fluoride, polyacrylonitrile, acrylonitrite butadiene-rubber, acrylonitrite butadiene stylene resin, acrylonitirite polyethylene chloride propylene diene stylene resin, acrylonitrite vinyl chloride resin, acrylonitrite metaaclylate resin, acrylonitrite acrylate resin, polyethylene oxide, or, polyether denatured siloxane are suitable and more than two kinds materials may be used by mixing among these materials. Copolymer making of polyvinylydene fluoride combined with hexafluoropropylene or with tetrafluoroethylene may be also used. Further, copolymer making of polyacrylonitrite combined with vinyl monomer such as vinyl acetate, methyl methacrylate, butyl methacrylate, methyl acrylic acid, butyl acrylic acid, itaconic acid, methyl acrylate hydroxide, ethyl acrylate hydroxide, acrylamid, vinyl chloride, vinylidene fluoride, or, vinylidene chloride may be used. Further more, copolymer making of polyethylene oxide combined with polypropylene oxide, methyl methacrylate, butyl methacrylate, methyl acrylic acid, or butyl acrylic acid may be used. In addition, vinylidine fluoride copolymer or ether denatured siloxane copolymer may be used.

After accommodating the electrolyte E into the tank 53, the electrolyte layers 23 are formed onto the exposed faces of the positive electrode mixture layers 26 on the belt-shaped positive electrode 21a. Here, for example, after the sensor 56 detects a boundary from a positive electrode collector exposed region B (see FIGS. 6 and 7) of the belt shaped positive electrode 21a to a positive electrode mixture layer exposed region C (see FIGS. 6 and 7) of the electrode 21a on the basis of that detection timing, the shatter 55, which closes the flowing path 51b of the nozzle 51 until this moment, is withdrawn under control of the controller 57 in order to open the flowing path 51b, and the supplying pump 54, which stops until this moment is driven with pressure in a range of 0.01 Mpa to 0.3 Mpa. Thereby, the pressure is applied onto the electrolyte E accommodated in the filling unit 51a, then, the electrolyte E is delivered from a delivering open of the nozzle 51 and applied onto the surface of the positive electrode mixture layers 26 in order to form the electrolyte layers 23.

Following this, after the sensor 56 detects a boundary from the positive electrode mixture layer exposed region C to a positive electrode collector exposed region B on the basis of that detection timing, the shutter 55, which opens the flowing path 51b until this moment, protrudes inside the flowing path 51b in order to close the flowing path 51b, and the supplying pump 54 stops driving. Thereby, deliver of the electrolyte E from the tank 53 stops.

Further, for example, after the sensor 56 detects a boundary from the collector exposed region B to a terminal exposed region D on the basis of that detection timing, a motor 58a is driven in order to withdraw the nozzle 51 at opposite side of the belt-shaped electrode under control of the controller 57. Therefore, in the case that a total thickness of the belt-shaped collector 25a and the positive electrode mixture layers 26 is thicker than that of the belt-shaped collector 25a and the positive electrode terminal 11, the belt-shaped electrode is conveyed continually without contact between the nozzle 51 and the positive electrode terminal 11. Succeedingly, after the sensor 56 detects a boundary from the terminal exposed region D to a collector exposed region B on the basis of that detection timing, the nozzle 51 returns in the previous position. Next, after the sensor 56 detects a boundary from the collector exposed region B to a positive electrode mixture layer exposed region C, the electrolyte layers 23 are formed onto the positive electrode mixture layers 26 in the same manner as mentioned above. The same procedures are repeated to make the electrolyte layers 23.

When the electrolyte E is applied from the nozzle 51, if its viscosity is, for example, in the rage of 0.001 Pa·s to 0.05 Pa·s, the electrolyte E passes through the flowing path 51b smoothly. In addition, the viscosity of the electrolyte E is adjustable as mentioned hereinafter. First, an unillustrated oil bath is provided in the vicinity of the filling unit 51a, and oil is heated inside the oil bath and circulated in order to heat the electrolyte E. As for another way, the viscosity of the electrolyte E is also adjustable by adding nonaqueous solvents, which has a low boiling point.

In connection with this, in the vicinity of the winding roller 62 of the coating machine, an unillustrated drier for drying the applied electrolyte, is disposed. The formed electrolyte layers 23 are conveyed to a position corresponding to the dryer, which dries the applied electrolyte. After this, the electrolyte layers 23 and the belt-shaped positive electrode 21a are covered with an unillustrated plastic film made of propylene together and rolled by the winding roller 62. As for this reason of covering it with the plastic film as mentioned above, it prevents that the nonaqueous solvents in the electrolyte layers 23 evaporate or the electrolyte layers 23 are absorbed the water.

On the other hand, in a similar manner as mentioned above, as shown in FIG. 8B, the negative electrode terminal 12 is attached to a region where the belt-shaped negative electrode collector 27a of a belt-shaped negative electrode 22a (that is, the negative electrode mixture layers 28 are disposed on the belt-shaped negative electrode collector 27a) as an electrode, is exposed. After this, the electrolyte layers 23 are intermittently formed on the whole exposed surface of the negative electrode mixture layers 28. Producing the belt-shaped negative electrode 22a is conducted with the following manner. First, lithium metal, lithium alloy such as alloy of lithium and aluminum, or negative electrode materials capable of occluding and releasing lithium are mixed with binders such as polyvinylidene uniformly, then, diffused to solvents such as dimethyl formaldehyde or N-methylpyrrolidone so as to make negative electrode mixture slurry. After this, the negative electrode mixture slurry is intermittently applied on the belt-shaped negative electrode collector 27a made of metal foil such as copper (Cu) foil and the like, then, the belt-shaped negative electrode collector 27 is dried and subjected to compression molding.

As for the negative electrode materials capable of occluding and releasing lithium, materials including one kind or more than two kinds materials among carbonaceous materials, silicon, or silicon compounds, metal oxide or macromolecule materials can be employed. As for the carbonaceous materials, pyrocarbons, cokes such as pitch coke, needle coke, or petroleum coke, graphites, glassy carbons, organic macromolecular compounds such that cellulose, phenolic resin, or furan resin are baked at proper temperature, carbon fiber or activated carbon can be employed. As for the silicon compounds, $Mg_2Si$ can be employed. As for the metal oxide, $SnO_2$ can be employed. As for the macromolecule materials, polyacetylene, polyaniline, polypyrrole, or disulfide polymer can be employed.

After a plurality of the electrolyte layers 23 is intermittently formed on the belt-shaped positive electrode 21a attached to the positive electrode terminal 11 and on the belt-shaped negative electrode attached to the negative electrode terminal 12 respectively, the belt-shaped positive electrode 21a and the belt-shaped negative electrode 22a are pulled from the winding roller 62 respectively and the plastic films covering the belt-shaped positive electrode 21a and the belt-shaped negative electrode 22a, are stripped.

With share cut, the belt-shaped positive electrode collector 25a is cut between the electrolyte layers 23 and the positive electrode terminal 11 (a X—X line in FIGS. 6 and 7), and separated individually. Thereby, a plurality of stacked bodies is formed. The plurality of the stacked bodies, which includes the positive electrode terminal 11 and is stacked the positive electrode mixture layers 26 and the electrolyte layers 23 sequentially onto the positive electrode collector 25 is formed. With the like manner as mentioned above, the belt-shaped negative electrode collector 27a is cut between the electrolyte layers 23 and the negative electrode terminal 12, and separated individually. Thereby, a plurality of stacked bodies is formed. The plurality of stacked bodies includes the negative electrode terminal 12, and is stacked the negative electrode mixture layers 28 and the electrolyte layers 23 sequentially onto the negative electrode collector 27. Following this, as shown in FIGS. 4 and 5, each of the stacked bodies is laminated in a manner to face their electrolyte layers 23 each other with the separator 24 in-between, and rolled in order to form the rolled electrode 20. The separator 24 is made of a porous film whose main base is polyolefin material such as polypropylene or polyethylene. A material stacked more than two kinds of this kind of porous film may be used.

After forming the rolled electrode 20, for instance, the pair of the films 30a and 30b which is comprised of the package member 30 is prepared. The rolled electrode 20 is sandwiched between the film 30a and the film 30b. In the ends of each of the films 30a and 30b where the positive electrode terminal 11 and the negative electrode terminal 12 are led, the films 31 are positioned in a manner to sandwich the positive electrode terminal 11 and the negative electrode terminal 12. Then, the positive electrode terminal 11 and the negative electrode terminal 12 are sandwiched respectively by the package member 30 with the films 31 in-between.

As for the pair of the films 30a and 30b, for instance, the laminate film laminated a nylon film, aluminum foil, and a polyethylene film in this order is employed, and the polyethylene film is deposited in a manner to be opposite to the rolled electrode 20. The film 30a, one of the films is shaped in a manner to be rounded off with remaining outmost parts corresponding to a shape of the rolled electrode 20 accommodated therein.

After sandwiching the rolled electrode 20 with the films 30a and 30b, in a low pressure atmosphere, the package member 30 is subjected to compression bonding with the rolled electrode 20 and each of outmost parts of the films 30a and 30b is stuck firmly by means of heat seal and so on. This completes the secondary battery shown in FIG. 3.

In the secondary battery manufactured as mentioned above, when charging, lithium is released as an ion from the positive electrode mixture layers 26 and occluded to the negative electrode mixture layers 28 via the electrolyte layers 23 and the separator 24. On the other hand, when discharging, lithium is released as an ion from the negative electrode mixture layers 28 and occluded to the positive electrode mixture layers 26 via the electrolyte layers 23 and the separator 24.

According to the method of manufacturing the battery relative to the embodiment as mentioned above, with a reason that after the positive electrode terminal 11 (the negative electrode terminal 12) is attached to the belt-shaped positive electrode 21a (the belt-shaped negative electrode 22a), the electrolyte layers 23 are formed, the number of manufacturing processes after forming the electrolyte layers 23 can decrease, which prevents that solvents in the electrolyte evaporates and the electrolyte layers 23 were absorbed the water. Thereby, manufacturing yields of the battery can increase. In addition, the battery which is excellent in discharge capabilities and stable in its voltage can be achieved.

Further, after intermittently forming the plurality of the positive electrode mixture layers 26 (the negative electrode mixture layers 28) onto the belt-shaped positive electrode collector 25a (the belt-shaped negative electrode collector 27a) and further forming the electrolyte layers 23 thereon, the belt-shaped positive electrode collector 25a (the belt-shaped negative electrode collector 27a) is cut, which prevents adhesion of the electrolyte to the region to which the positive electrode terminal 11 (the negative electrode terminal 12) is attached. Thereby, a conventional stripping electrolyte process become unnecessary, which can lead to increase productivity. Additionally, the electrolyte is not applied onto unnecessary parts, which can reduce manufacturing cost.

Further more, with the supplying pump 54, pressure is equally applied on the electrolyte E so as to push the electrolyte E from the nozzle 51, which can deliver a desired amount of the electrolyte. Thereby, the electrolyte layers 23 can be formed in a manner to be thin and even in both width and longitudinal directions, which can attain an equal amount of the electrolyte containing in each of batteries. In case that any accidents happen while the electrode is conveyed, the supplying pump 54 stops in order not to deliver the electrolyte, thus, a coating failure can be prevented and production control in an electrolyte layer forming process can be achieved easily.

Obviously many modifications and variations of the present invention are possible in the light of the above teachings. It is therefore to be understood that within the scope of the appended claims the invention may be practiced otherwise than as specifically described.

EXAMPLE

Next, specific examples of the present invention will be described in detail.

As for Examples 1–5, 100 secondary batteries were produced by a method described hereinafter.

First, 100 part by mass of $LiCoO_2$ as a positive electrode active material, 5 part by mass of carbon black as a conducting agent, and 10 part by mass of polyvinylidene fluoride as a binder were diffused to N-methylpyrrolidone as a solvent in order to make positive electrode mixture slurry, and the positive electrode slurry was intermittently applied in a manner to be 50 $\mu$m thickness (thickness after dry) onto a surface and a back of a belt-shaped positive electrode collector made of aluminum foil whose thickness was 15 $\mu$m in order to form positive mixture layers, after this, the positive mixture layers were dried and subjected to compression molding to produce the belt-shaped positive electrode. At this point, 100 pairs of the positive electrode mixture layers were formed onto the both faces of the belt-shaped positive electrode collector. Following this, positive electrode terminals made of aluminum whose thickness were 70 $\mu$m were welded to collector exposed regions on the surface of the belt-shaped positive electrode collector, and then, insulating tapes whose thickness were 100 $\mu$m were laminated in a manner to cover these positive electrode terminals.

Next, with the same machine as the coating machine shown in FIG. 9, electrolyte layers were formed on exposed faces of each of the positive mixture layers on the both faces of the belt-shaped positive electrode collector, after this, the electrolyte was dried, then, the belt-shaped positive electrode having the electrolyte layers were covered with a polypropylene film, and rolled. Following this, the rolled belt-shaped positive electrode was preserved hermetically inside a case in a dry atmosphere.

At this moment, as for electrolyte, a material such that copolymer making of vinylidene fluoride combined with hexafluoropropylene was dissolved into a solvent, which ethylene carbonate, propylene carbonate, and γ-butyl lactone are mixed and further dissolved $LiPF_6$ as an electrolyte salt thereinto, was employed. A distance from a delivering open of an electrolyte delivering machine to the positive electrode mixture layers was determined as 80 $\mu$m. In the case that the delivering open of the nozzle was opposite to the positive electrode terminals, the nozzle was located away in 400 $\mu$m from the belt-shaped positive electrode collector.

On the other hand, 100 part by mass of carbon graphite as a negative electrode material capable of occluding and releasing lithium, and 15 part by mass of polyvinylydene fluoride as a binder were diffused to N-methylpyrrolidone as a solvent in order to make negative electrode mixture slurry, and the negative electrode mixture slurry was intermittently applied in a manner to be 50 $\mu$m thickness (thickness after dry) onto a surface and a back of belt-shaped negative electrode corrector made of copper foil whose thickness is 15 $\mu$m in order to form negative electrode mixture layers, after this, the negative electrode mixture layers were dried and subjected to compression molding to produce the belt-shaped negative electrode. At this point, 100 pairs of the negative mixture layers were formed onto the both faces of the belt-shaped negative collector. Following this, negative electrode terminals made of copper foil whose thickness were 70 $\mu$m were welded to collector exposed regions on the surface of the belt-shaped negative electrode collector, and the insulating tapes whose thickness was 100 $\mu$m were laminated in a manner to cover these negative electrode terminals.

Following this, with the same manner as the belt-shaped positive electrode, electrolyte layers were formed on exposed faces of each of the negative electrode mixture layers on the both faces of the belt-shaped negative electrode collector, then, the electrolyte was dried and belt-shaped negative electrode having the electrolyte layers were covered with a polypropylene film, and rolled. Following this, the rolled belt-shaped negative electrode was preserved hermetically inside a case in the dry atmosphere.

After achieving the belt-shaped positive electrode on which the positive electrode terminals and the electrolyte layers were formed and the belt-shaped negative electrode on which the negative electrode terminals and the electrolyte layers were formed, the plastic films covering the belt-shaped positive electrode and the belt-shaped negative electrode, were stripped. Then, the belt-shaped positive electrode collector was cut between the electrolyte layers and the positive electrode terminals to separate in 100 positive electrodes. The belt-shaped negative electrode collector was cut between the electrolyte layers and the negative electrode terminals to separate in 100 negative electrodes.

After separating the belt-shaped positive electrode and the belt-shaped negative electrode, the positive electrodes on which the positive electrode terminals and the electrolyte layers were formed and the negative electrodes on which the negative electrode terminals and the electrolyte layers were formed, were rolled many times with the separators in-between in order to be produced 100 rolled electrodes.

Then, for each of rolled electrodes, two laminate films laminated a nylon film, aluminum foil and a polyethylene film in this order were prepared and the rolled electrodes were sandwiched between the two laminate films. In ends where the positive electrode terminal and the negative electrode terminal were led, a film for enhancing adhesion was disposed in a manner to sandwich each of terminals. The laminate films were subjected to compression bonding with the rolled electrodes, and outmost parts of each of the laminate films were sealed with heat, which achieved 100 secondary batteries. That is, in Example 1–5, one lot including 100 secondary batteries were produced five lots. Achieved batteries were measured by 3.8 mm thickness, 35 mm width, and 62 mm height.

As for Comparative examples 1–5 relative to Examples 1–5, one lot including 100 secondary batteries were produced five lots with the like manner as Examples 1–5 except in that the belt-shaped positive electrode and the belt-shaped negative electrode were impregnated into a tank accommodating the electrolyte and pull up from the tank, then, the electrolyte adhering to both faces of the electrodes was scrapped with a pair of doctor knives in order to form the electrolyte layers, and then, the electrolyte adhering to regions to which the positive electrode terminal and the negative electrode terminal were attached was stripped in order to attach each of the terminals.

As for each of the secondary batteries in Examples and Comparative examples achieved as mentioned above, discharge capacity was observed by charging and discharging. At this moment, after charging was carried out with 250 mA of constant current density until the battery voltage reached to 4.2 V, charging with 4.2 V of constant voltage was carried out until total charging time reached to four hours. On the other hand, discharging was carried out with 100 mA of constant current density until the battery voltage reached to 3.0 V. As each of the secondary batteries, the batteries whose discharge capacity was over 500 mA were determined as a conforming battery, the ratio of a conforming battery was observed in each of Examples and Comparative examples.

The results were shown in Table 1.

TABLE 1

| | Ratio of conforming battery (%) |
|---|---|
| Example 1 | 79 |
| Example 2 | 81 |
| Example 3 | 86 |
| Example 4 | 85 |
| Example 5 | 87 |
| Comparative example 1 | 67 |
| Comparative example 2 | 67 |
| Comparative example 3 | 68 |
| Comparative example 4 | 74 |
| Comparative example 5 | 75 |

As understood in Table 1, the ratio of a conforming battery in Comparative examples 1–5 were 67–75%, on the other hand, that of Examples 1–5 were comparatively 79–87%, that is, the ratio of a conforming battery (yields) in Examples 1–5 were higher than that of Comparative examples 1–5. This shows that if the secondary battery is formed with the positive electrode and the negative electrode achieved by intermittently forming the electrolyte layers and cutting after attaching the terminals on the electrodes, the battery with stable supply and excellent in discharge capability can be attained.

As described above, although the present invention was described by referring the embodiment and examples, the present invention is not limited by the embodiment and examples and various modifications can be attained. For instance, although in the above-mentioned embodiment and examples, the case where a plurality of the batteries was manufactured simultaneously, was specifically described, the present invention can be applied to a case where a battery is produced individually.

Additionally, although in the above-mentioned embodiment and examples, the case where the electrolyte layers 23 were formed using the electrolyte delivering-machine 50 shown in FIG. 7, was described, it is unnecessary that such a delivering-machine is always used. Other means can be applied to form the electrolyte layers 23.

Further, although in the above-mentioned embodiment, when attaching the electrode terminals on the belt-shaped electrode collector, the adhesive material 41 was employed, welding may be used to attachment of the electrode terminals as described in Examples 1–5.

Further more, although in the above-mentioned embodiment and examples, the gel-type electrolyte layers 23 were formed, electrolyte layers made of a solid-type electrolyte, which is diffused electrolyte salts to macromolecular compounds having ion conductivity or electrolyte layers made of a solid-type inorganic electrolyte may be employed. Such solid-type electrolyte layers can be achieved by completely evaporating nonaqueous solvents after applying electrolyte with flowability on the electrode mixture layers.

Further still, although in the above-mentioned embodiment, the case where the electrode mixture layers were formed on the both faces of the belt-shaped electrode collector was described, the electrode mixture layers may be formed on a single face of the belt-shaped electrode collector. In addition, although in the above-mentioned embodiment, the case where the electrolyte layers were formed on a single face of the belt-shaped electrode collector was described, the electrolyte layers may be formed on the both faces of the belt-shaped electrode collector as described in Examples 1–5.

Much further, although in the above-mentioned embodiment and examples, the battery having the structure such that the rolled electrode 20 was enclosed inside the laminate film was described, the present invention can be applied to produce other batteries having various shapes such as a cylindrical shape.

Still further, although in the above-mentioned embodiment and examples, the battery whose battery reaction is lithium was described, the present invention can be applied to a cases where other batteries whose battery reaction is sodium (Na), or calcium (Ca) are produced. In this case, as an electrolyte salt, sodium salt or calcium salt is employed in replace of lithium salt, and as a positive electrode active material, proper metal oxide material or metal sulfide is employed.

Additionally, although in the above-mentioned embodiment, the case where the secondary battery is produced was described, the present invention can be applied to produce a primary battery.

While the invention has been described with reference to specific embodiment chosen for purpose of illustration, it should be apparent that numerous modifications could be made there to by those skilled in the art without departing from the basic concept and scope of the invention.

What is claimed is:

1. A method of manufacturing a battery including a positive electrode, a negative electrode and an electrolyte layer, wherein a terminal is attached to one face of at least either the positive electrode or the negative electrode, comprises:
   (a) intermittently forming an electrode mixture layer including electrode active material on an electrode collector in at least one electrode of either the belt-shaped positive or the belt-shaped negative electrode;
   (b) attaching the terminal to an electrode collector exposed region where the electrode mixture layer is unformed;
   (c) forming the electrolyte layer on at least a region where the electrode mixture layer is formed;
   (d) forming the electrolyte layer by delivering electrolyte with an electrolyte-delivering machine having a pressurization means; and
   (e) cutting the electrode collector between the electrode mixture layer which is intermittently formed.

2. A method of manufacturing a battery according to claim 1, wherein the electrolyte is delivered as being applied to heat for adjusting its viscosity.

3. A method of manufacturing a battery according to claim 1, wherein the electrolyte is delivered in a state where the electrolyte is applied to heat for adjusting its viscosity in the range of 0.001 Pa·s to 0.05 Pa·s.

4. A method of manufacturing a battery according to claim 1, wherein a belt-shaped electrode to which a terminal is attached, is conveyed, and the electrolyte is intermittently pushed to form the electrolyte layer on the belt-shaped electrode.

5. A method of manufacturing a battery according to claim 4, wherein when a region to which the terminal is attached is opposed to a delivering open of the electrolyte-delivering machine, the delivering open is located away from an electrode face.

6. A method of manufacturing a battery according to claim 4, wherein the electrolyte is intermittently delivered by opening and closing a shutter disposed in an electrolyte flowing path of the electrolyte-delivering machine.

7. A method of manufacturing a battery according to claim 4, comprises a step of rolling the electrode after the electrolyte is delivered and dried, then the electrode face of the electrode on which the electrolyte layer is formed, is covered with a plastic film.

8. A method of manufacturing a battery comprising:
   (a) forming an electrode mixture layer including electrode active material on a first region but not on an exposed region of an electrode collector wherein the first region is formed with an electrolyte layer, and wherein the electrode collector is cut between the electrode mixture layer which is intermittently formed;
   (b) attaching a terminal to the exposed region, wherein the electrode mixture layer is not formed on the exposed region between the attaching of the terminal and the forming of the electrode mixture layer; and
   (c) disposing a protection tape in a manner of covering a part of the terminal after the terminal is attached to the electrode collector exposed region.

9. A method of manufacturing a battery according to claim 8, wherein electrolyte includes electrolyte salts and macromolecular compounds.

10. A method of manufacturing a battery according to claim 9, wherein the electrolyte further includes nonaqueous solvents.

11. A method of manufacturing a battery according to claim 10, wherein the nonaqueous solvents includes at least one material among a group of ethylene carbonate, propylene carbonate, butylene carbonate, γ-butyl lactone, γ-valerolactone, diethoxyethane, tetrahydrofuran, 2-methyltetrahydrofuran, 1,3-dioxolane, methyl acetate, methyl propionicacid, dimethyl carbonate, diethyl carbonate, ethylmethyl carbonate, 2,4-difluoroanisole, 2,6-difluoroanisole, 4-bromoveratrol.

12. A method of manufacturing a battery according to claim 9, wherein the electrolyte salts includes one kind material among a group of $LiPF_6$, $LiAsF_6$, $LiBF_4$, $LiClO_4$, $LiCF_3SO_3$, $Li(CF_3SO_2)_2N$ or $LiC_4F_9SO_3$.

13. A method of manufacturing a battery according to claim 9, wherein the macromolecular compounds includes at least one material among a group of polyvinylidene fluoride, polyacrylonitrile, acrylonitrite butadiene-rubber, acrylonitrite butadiene stylene resin, acrylonitirite polyethylene chloride propylene diene stylene resin, acrylonitrite vinyl chloride resin, acrylonitrite metaaclylate resin, acrylonitrite acrylate resin, polyethylene oxide, polyether denatured siloxane, copolymer made of polyvinylidene combined with other macromolecular compounds, copolymer made of polyacrylonitrile combined with other macromolecular compounds, copolymer made of polyetylene oxide combined with other macromolecular compounds.

14. A method of manufacturing a battery according to claim 8, wherein the positive electrode includes lithium mixed oxide shown in a general formula: $Li_xMO_2$, where x satisfies $0.05 \leq x \leq 1.12$, and M is more than one kind transition metal; and the negative electrode includes at least one material among a group of materials capable of occluding and releasing lithium such as carbonaceous materials, silicon, silicon compounds, metal oxide, macromolecular.

15. A method of manufacturing a battery according to claim 8, wherein the electrode mixture layers are formed on both faces of the electrode collector, the electrode mixture layers are respectively formed on different regions in the surface and the back of the electrode collector.

* * * * *